United States Patent
Wu et al.

(10) Patent No.: US 6,585,945 B2
(45) Date of Patent: Jul. 1, 2003

(54) $SO_x$ TOLERANT $NO_x$ TRAP CATALYSTS AND METHODS OF MAKING AND USING THE SAME

(75) Inventors: Joseph H-Z. Wu, Somerset, NJ (US); Joseph C. Dettling, Howell, NJ (US)

(73) Assignee: Engelhard Corporation, Iselin, NJ (US)

( * ) Notice: Subject to any disclaimer, the term of this patent is extended or adjusted under 35 U.S.C. 154(b) by 63 days.

(21) Appl. No.: 09/771,280

(22) Filed: Jan. 26, 2001

(65) Prior Publication Data

US 2002/0141921 A1 Oct. 3, 2002

(51) Int. Cl.[7] .............................................. B01D 53/56
(52) U.S. Cl. ............................. 423/239.1; 423/213.2; 423/213.5; 423/244.01; 423/244.02; 423/244.04; 423/244.07; 423/244.09; 423/244.1
(58) Field of Search .......................... 423/213.2, 213.5, 423/239.1, 244.01, 244.02, 244.04, 244.07, 244.09, 244.1

(56) References Cited

U.S. PATENT DOCUMENTS

| | | | |
|---|---|---|---|
| 3,963,630 A | | 6/1976 | Yonezawa et al. .......... 252/62.9 |
| 5,727,385 A | | 3/1998 | Hepburn ....................... 60/297 |
| 5,750,082 A | | 5/1998 | Hepburn et al. .......... 423/213.5 |
| 5,753,192 A | | 5/1998 | Dobson et al. ............. 422/177 |
| 5,758,489 A | | 6/1998 | Hepburn et al. .............. 60/274 |
| 5,795,553 A | | 8/1998 | Lott et al. ................. 423/213.2 |
| 5,837,212 A | * | 11/1998 | Hepburn et al. .......... 423/213.2 |
| 5,910,097 A | | 6/1999 | Boegner et al. ............... 60/278 |
| 6,004,521 A | * | 12/1999 | Miyoshi et al. ........... 423/213.5 |
| 6,010,673 A | * | 1/2000 | Kanazawa et al. ....... 423/213.5 |

OTHER PUBLICATIONS

J. Amer. Cer. Soc., vol. 36, No. 9 Sep. 1, 279–285 (1953), George W. Morey.
J. Mat. Sci. Letters 15, 1249–1250 (1996), M. Hirano et al.
J. Mat. Sci. Letters 7, 601–603 (1988), T.R.N. Kutty et al.
Ceram. Trans. 1988, vol. 1, Ceram. Powder Sci. 2, Pt. A, 154–162.

* cited by examiner

*Primary Examiner*—Stanley S. Silverman
*Assistant Examiner*—Timothy C. Vanoy
(74) *Attorney, Agent, or Firm*—Richard A. Negin

(57) ABSTRACT

The present invention relates to sulfur tolerant catalyst composites useful for reducing contaminants in exhaust gas streams, especially gaseous streams containing sulfur oxide contaminants. More specifically, the present invention is concerned with improved NOx trap catalysts for use in diesel engines as well as lean burn gasoline engines. The sulfur tolerant NOx trap catalyst composites comprise a platinum component, a support, and a NOx sorbent component prepared by hydrothermal synthesis. The NOx sorbent component comprises a first metal oxide and a second metal oxide. The metal in the first metal oxide is selected from the group consisting of aluminum, titanium, zirconium, silicon, and composites thereof, and the metal in the second metal oxide is selected from the group consisting of Group IIA metals, Group III metals, Group IV metals, rare earth metals, and transition metals. The metal in the first metal oxide is different from the metal in the second metal oxide. The sulfur tolerant NOx trap catalyst composites are highly effective with a sulfur containing fuel by trapping sulfur oxide contaminants which tend to poison conventional NOx trap catalysts. The sulfur tolerant NOx trap catalyst composites are particularly suitable for diesel engines because the composites can be regenerated at moderate temperatures with rich pulses, rather than at high temperatures.

20 Claims, No Drawings

SO$_x$ TOLERANT NO$_x$ TRAP CATALYSTS AND METHODS OF MAKING AND USING THE SAME

BACKGROUND OF THE INVENTION

1. Field of the Invention

The present invention relates to sulfur tolerant catalyst composites useful for reducing contaminants in exhaust gas streams, especially gaseous streams containing sulfur oxide contaminants. More specifically, the present invention is concerned with improved NOx trap catalysts for use in diesel engines as well as lean burn gasoline engines. The sulfur tolerant NOx trap catalyst composites comprise a platinum component, a support, and a NOx sorbent component prepared by hydrothermal synthesis. The NOx sorbent component comprises a first metal oxide and a second metal oxide. The metal in the first metal oxide is selected from the group consisting of aluminum, titanium, zirconium, silicon, and composites thereof, and the metal in the second metal oxide is selected from the group consisting of Group IIA metals, Group III metals, Group IV metals, rare earth metals, and transition metals. The metal in the first metal oxide is different from the metal in the second metal oxide. The sulfur tolerant NOx trap catalyst composites are highly effective with a sulfur containing fuel by trapping sulfur oxide contaminants which tend to poison conventional NOx trap catalysts. The sulfur tolerant NOx trap catalyst composites are particularly suitable for diesel engines because the composites can be regenerated at moderate temperatures with rich pulses, rather than at high temperatures.

2. Related Art

Diesel powered vehicles represent a significant portion of the vehicle market worldwide. In Europe, the market share of diesel passenger cars is about one third and is expected to grow even higher in the years ahead. Compared to gasoline powered vehicles, diesel vehicles offer better fuel economy and engine durability. As diesel passenger cars become more popular both in Europe and elsewhere, emissions reduction is an increasingly urgent issue. In fact, Euro Stage IV regulations (year 2005) are calling for a 50% reduction of NOx emissions (0.25 g/km) compared to the Stage III (year 2000) level (0.5 g/km). For some vehicles, it would be difficult to meet the Euro IV NOx emissions target by engine improvement alone. It may be impossible to meet Euro V NOx regulations (0.125 g/km) without highly efficient after-treatment technologies.

Reducing NOx from diesel exhaust is very challenging. The 3-way catalyst technology, which is widely used in the gasoline cars, is not operational in diesel vehicles. A 3-way catalyst requires the exhaust emissions near a stoichiometric point, neither fuel rich (reducing) nor lean (oxidizing), while diesel emissions are always lean. In the early 90's, the concept of NOx trap catalyst was explored for gasoline partial lean burn (PLB) engines where the NOx catalyst would trap NOx in a lean environment and reduce it in a rich environment.

To apply the NOx trap concept to diesel passenger cars, some special issues related to diesel emission characteristics needed to be addressed. The exhaust temperature for light-duty diesel vehicles is typically in the range of 100–400° C., which is much lower than the gasoline exhaust. Therefore, low temperature oxidation activity and reduction during a rich spike is critical. One of the most difficult challenges in applying this concept is the issue of sulfur poisoning. The exhaust sulfur forms a very strong sulfate on any basic metal site, which prevents the formation of nitrate, rendering the catalyst ineffective for trapping NOx. As with other catalytic converters, thermal stability is another important issue for practical application.

The operation of a NOx trap catalyst is a collection of a series of elementary steps, and these steps are depicted below in Equations 1–5. In general, a NOx trap catalyst should exhibit both oxidation and reduction functions. In an oxidizing environment, NO is oxidized to NO$_2$ (Equation 1), which is an important step for NOx storage. At low temperatures, this reaction is typically catalyzed by precious metals, e.g., Pt. The oxidation process does not stop here. Further oxidation of NO$_2$ to nitrate, with incorporation of an atomic oxygen, is also a catalyzed reaction (Equation 2). There is little nitrate formation in absence of precious metal even when NO$_2$ is used as the NOx source. The precious metal has the dual functions of oxidation and reduction. For its reduction role, Pt first catalyzes the release of NOx upon introduction of a reductant, e.g., CO (carbon monoxide) or HC (hydrocarbon) (Equation 3). This may recover some NOx storage sites but does not contribute to any reduction of NOx species. The released NOx is then further reduced to gaseous N$_2$ in a rich environment (Equations 4 and 5). NOx release can be induced by fuel injection even in a net oxidizing environment. However, the efficient reduction of released NOx by CO requires rich conditions. A temperature surge can also trigger NOx release because metal nitrate is less stable at higher temperatures. NOx trap catalysis is a cyclic operation. Metal compounds are believed to undergo a carbonate/nitrate conversion, as a dominant path, during lean/rich operations. The sulfur poisoning of a NOx trap catalyst is depicted below in Equations 6–7. In Equation 6, S occupies a site for NOx and in Equation 7, SOx replaces CO$_3$ or NOx.

Oxidation of NO to NO$_2$ $$NO + \tfrac{1}{2}O_2 \rightarrow NO_2 \tag{1}$$

NOx Storage as Nitrate $$2NO_2 + MCO_3 + \tfrac{1}{2}O_2 \rightarrow M(NO_3)_2 + CO_2 \tag{2}$$

NOx Release $$M(NO_3)_2 + 2CO \rightarrow MCO_3 + NO_2 + NO + CO_2 \tag{3}$$

NOx Reduction to N$_2$ $$NO_2 + CO \rightarrow NO + CO_2 \tag{4}$$

$$2NO + 2CO \rightarrow N_2 + 2CO_2 \tag{5}$$

SOx Poisoning Process $$SO_2 + \tfrac{1}{2}O_2 \rightarrow SO_3 \tag{6}$$

$$SO_3 + MCO_3 \rightarrow MSO_4 + CO_2 \tag{7}$$

In Equations 2, 3, and 7, M represents a divalent metal cation. M can also be a monovalent or trivalent metal compound in which case the equations need to be rebalanced.

Comparative investigations on the currently most discussed lean burn DeNOx technologies comprising the continuously operating selectively catalytic reduction (SCR) of V-, Pt-, Ir-technologies as well as the discontinuously operating NOx adsorption technology suggest that the latter technology shows the most promising overall performance in terms of NOx, HC and CO removal in view of the proposed EURO III/IV legislation. The sulfur concentration yields decisive influence on the long-term activity of the NOx adsorption catalysts and it is shown by a worst case study, that even the use of low-sulfur fuel does not prevent the accumulation of sulfur on the NOx adsorption catalyst. The accumulation of sulfur on the catalyst has to be counteracted by an engine induced desulfation strategy, by which the sulfur is driven out of the NOx adsorption catalyst. This requires the provision of reducing exhaust gas at elevated temperature for a short period of time. An optimization of the desulfation parameters is mandatory in order to suppress the formation of $H_2S$. It is conjectured that the thermal degradation of the NOx adsorption catalyst proceeds via two different deactivation modes. The first one is based upon the loss of Pt dispersion and is accelerated by the presence of oxygen while the second one can be traced back to the reaction between NOx storage components and the porous support material. Wolfgang Strehlau et al., Conference "Engine and Environment" 97.

Direct injection technology for diesel engines as well as for gasoline engines are the most favored ways to reduce the $CO_2$ emissions in the future. NOx adsorber technology for gasoline DI engines as well as for HSDI diesel engines is the favored technology to meet future emission limits. Adsorber catalysts have demonstrated their potential to meet future emission legislation levels on prototype basis for gasoline and diesel engines. Improving the NOx adsorber technology and the integration of the adsorber system into the powertrain for the introduction into the European market is the challenge for the near future.

Using a catalyst cannot reduce much NOx pollutant in a lean burn condition. Abating NOx by a catalyst is very difficult in a lean (oxidation) environment. So far, use of any known catalysts (without a NOx trap) has achieved only very low conversion %. In order to convert NOx to N2, a reducing atmosphere is required. In the normal working condition of a diesel or lean burn engine, there is no reducing atmosphere, but always a lean (oxidation) engine out gas flow. Under such lean condition, NOx goes through the exhaust, as a pollutant, with little or no reduction.

A NOx trap traps (adsorbs) NOx in a lean environment so that NOx is depleted from the exhaust gas stream. However, once the limited capacity of the trap is used up, no more NOx will be trapped. A NOx trap is useful only when it can be regenerated. For instance, barium oxide can be used as a regenerable NOx trap. In lean (oxidation) environment, barium oxide continues to trap NOx and form nitrate until its capacity being used up. To regenerate the trap, the gas flow is switched to rich (reducing) for a short period of time, when NOx is desorbed quickly from the trap, forming $N_2$, and the trap is regenerated back to barium oxide. Engine management or a hydrocarbon injection can be used to create this rich environment. After regeneration, the NOx trap (ideally) recovers its full capacity as a fresh trap. Thus, an ideal NOx trap continuously works in the alternative lean/rich environment.

During the regeneration (rich) period, NOx is released but not out the exhaust as a pollutant. Because a catalyst is used in conjunction with the trap, the released NOx is reduced to $N_2$ in the reducing (rich) environment. Therefore, in the regeneration period, not only the NOx trap is regenerated, but also the released NOx is converted to harmless $N_2$ and $CO_2$.

If no SOx appears in the gas stream, many NOx traps, including barium oxide, work well. Unfortunately, there is always SOx. Although the amount of SOx is much less than NOx (e.g. SOx: NOx=1:100), SOx will eventually poison the NOx trap. This is because that SOx is a much stronger reactant than NOx. Once SOx is adsorbed on a site of the NOx trap, it sticks (forms sulfate). SOx competes for sites with NOx and the trap is eventually poisoned. In addition, sulfated barium NOx trap cannot be regenerated (sulfated barium oxide needs a much higher temperature to regenerate than that of a normal NOx regeneration process).

The underlying theory of hydrothermal synthesis and the apparatus used is described in "Hydrothermal Synthesis", George W. Morey, *Journal of the American Ceramic Society,* Sep. 1, 1953. By way of illustration, the determination of the solubility of quartz in superheated steam at high pressures and the determination of the compositions of coexisting gas and liquid phases in the system $H_2O—Na_2O—SiO_2$ at 400° C. are discussed.

The hydrothermal synthesis of lead titanate is reported to involve the treatment of lead and titanium containing aqueous feedstocks at temperatures ranging from 200° to 300° C. at autogenous pressures. Suitable sources of lead and titanium can be the oxides, or metal hydrous oxides derived from perchlorates, nitrates, acetates or alkoxides. Titanium isopropoxide and lead acetate have been used to study the hydrothermal synthesis of lead titanate particles. Two mechanisms are involved in the synthesis of lead titanate particles: 1) dissolution of the hydrous metal oxide feedstock followed by precipitation and, 2) in situ crystallization of the hydrous oxide particles. "Hydrothermal Formation Diagram In The Lead Titanate System" D. J. Watson et al., *Ceram. Trans,* 1988, vol 1, *Ceram. Powder Sci.* 2, Pt. A, 154–162.

The advantages of the hydrothermal synthesis of Ba-polytitanates in the form of fine powders has been reported in connection with microwave applications. "Hydrothermal precipitation and characterization of polytitanates in the system $BaO—TiO_2$," T. R. N. Kutty et al., *Journal Of Materials Science Letters* 7, 601–603 (1988).

U.S. Pat. No. 3,963,630 (Yonezawa et al.) discloses a process for producing crystalline powder of a composition represented by the formula, $PbTi_qZr_pO_3$. In the formula, q and p represent mole ratios, the sum of q and p is equal to 1.00, the mole ratio q is not smaller than 0.45 and not greater than 0.90, the mole ratio p is not smaller than 0.10 and not greater than 0.55. The process comprises the steps of preparing an acidic aqueous solution of the metallic elements in the mole ratios given in the formula, neutralizing the aqueous solution to provide a suspension of hydroxides of the metallic elements, subjecting the suspension in an autoclave under pressure to a temperature between 150° and 300° C. for a time sufficient to produce precipitate of the composition and of an average particle size between 0.02 and 0.2 micron in a mother liquor, and separating the precipitate from the mother liquor.

U.S. Pat. No. 5,727,385 (Hepburn '385) discloses a catalyst system, located in the exhaust gas passage of a lean-burn internal combustion engine, useful for converting carbon monoxide, nitrogen oxides, and hydrocarbons present in the exhaust gas. The catalyst system comprises two-components: (1) a lean-burn nitrogen oxide catalyst being a transition metal selected from the group consisting of copper, chromium, iron, cobalt, nickel, iridium, cadmium, silver, gold, platinum, manganese, and mixtures thereof loaded on a refractory oxide or exchanged into zeolite; and (2) a nitrogen oxide (NOx) trap material which absorbs NOx when the exhaust gas flowing into the trap material is lean and releases the absorbed NOx when the concentration of oxygen in the inflowing exhaust gas is lowered. The nitrogen oxide trap material is located downstream of the lean-burn nitrogen oxide catalyst in the exhaust gas passage such that the exhaust gases are exposed to the lean-burn catalyst prior to being exposed to the nitrogen oxide trap material.

U.S. Pat. No. 5,750,082 (Hepburn et al. '082) discloses a nitrogen oxide trap useful for trapping nitrogen oxide present in the exhaust gases generated during lean-burn operation of an internal combustion engine. The trap comprises distinct catalyst phases: (a) a porous support loaded with catalyst comprising 0.1 to 5 weight % platinum; and (b) another porous support loaded with 2 to 30 weight % catalyst of an alkaline metal material selected from the group consisting of alkali metal elements and alkaline earth elements.

U.S. Pat. No. 5,753,192 (Dobson et al.) discloses a nitrogen oxide trap useful for trapping nitrogen oxide present in an exhaust gas stream generated during lean-burn operation of an internal combustion engine and releasing the absorbed nitrogen oxides when the oxygen concentration of the exhaust gas is lowered. The trap comprises a porous support loaded with 6–15 wt. % strontium oxide; and loaded thereon together: (a) 0.5–5 wt. % precious metal selected from platinum, palladium, rhodium and mixtures thereof; (b) 3.5–15 wt. % zirconium; and (c) 15–30 wt. % sulfate.

U.S. Pat. No. 5,758,489 (Hepburn et al. '489) discloses a nitrogen oxide trap useful for trapping nitrogen oxide present in the exhaust gases generated during lean burn operation of an internal combustion engine. The trap comprises a porous support; and catalysts comprising at least 10 weight percent lithium and 0.2 to 4 weight percent platinum loaded on the porous support.

U.S. Pat. No. 5,759,553 (Lott et al.) discloses a NOx adsorber material comprising an activated alkali metal-doped and copper-doped hydrous zirconium oxide material that adsorbs NOx in an oxidizing atmosphere and desorbs NOx in a non-oxidizing atmosphere.

U.S. Pat. No. 5,910,097 (Boegner et al.) discloses an exhaust emission control system for an internal combustion engine. The system comprises two adsorber parts arranged in parallel for alternate adsorption and desorption of nitrogen oxides contained in an exhaust from an engine. A means for conducting the exhaust further downstream is provided emerging from one of the two adsorber parts currently operated in the adsorption mode and for recycling the exhaust emerging from the other of the two adsorber parts operating in the desorption mode into an intake line of the engine. An oxidizing converter is located near the engine and upstream from the adsorber parts for oxidation of at least NO contained in the exhaust to $NO_2$. An exhaust line section is located upstream of the adsorber parts and is divided into a main line branch and a partial line branch parallel to the main line branch. The two adsorber parts are connected by control valves to the main line branch and the partial line branch such that the one adsorber part that is operating in the adsorption mode is fed by the exhaust stream from the main line branch and the other adsorber part that is operating in the desorption mode is supplied by the exhaust stream from the partial line branch.

European patent application 589,393A2 discloses a method for purifying an oxygen rich exhaust gas by simultaneously removing the carbon monoxide, hydrocarbons, and nitrogen oxides contained in the exhaust gas. The method comprises bringing the oxygen rich exhaust gas into contact with an exhaust gas purifying catalyst comprised of (i) at least one noble metal selected from the group consisting of platinum and palladium (ii) barium, and (iii) at least one metal selected from the group consisting of alkali metals, iron, nickel, cobalt and magnesium, supported on a carrier composed of a porous substance.

European patent application 669,157A1 discloses a catalyst for purifying exhaust gases. The catalyst comprises a heat resistant support; a porous layer coated on the heat resistant support; a noble metal catalyst ingredient loaded on the porous layer; and an NOx storage component selected from the group consisting of alkaline-earth metals, rare-earth elements and alkali metals, and loaded on the porous layer. The noble metal catalyst ingredient and the NOx storage component are disposed adjacent to each other, and dispersed uniformly in the porous layer.

European patent application 764,459A2 discloses a nitrogen oxide trap useful for trapping nitrogen oxide present in the exhaust gases generated during lean-burn operation of an internal combustion engine. The trap comprises distinct catalyst phases (a) a first porous support loaded with catalyst comprising 0.1 to 5 weight % platinum; and (b) a second porous support loaded with 2 to 30 weight % catalyst of a material selected from the group consisting of alkali metal elements and alkaline earth elements.

European patent application 764,460A2 discloses a nitrogen oxide trap useful for trapping nitrogen oxide present in the exhaust gases generated during lean-burn operation of an internal combustion engine. The trap comprises a porous support; and catalysts consisting of manganese and potassium loaded on the porous support.

Laboratory and engine tests were carried out to describe the sulfur effect on the NOx adsorbers catalysts efficiency for gasoline lean burn engines. One aspect of the study dealt with the NOx storage efficiency of the adsorber under laboratory conditions, especially regarding the SO2 gas phase concentration. The rate of sulfur storing is greatly affected by the SO2 gas concentration. While 6.5 hours are required to go from 70% NOx reduction to only 35% when the gas mixture contains 10 ppm SOx, it takes 20 hours with 5 ppm of SOx and more than 60 hours with a 2 ppm SO2 condition. The relationship between the loss in NOx trap performance and SO2 concentration appears to have an exponential shape. The same amount of sulfur (0.8% mass) is deposited onto the catalyst within 10 hours with the feed gas containing 10 ppm of SO2 and within 50 hours with 2 ppm SO2. Nevertheless, it was shown that the loss in NOx-trap efficiency is not the same in these two cases. The efficiency decreased from 70% to 25% in the first case (with 10 ppm SO2) and from 70% to only 38% in the second case (with 2 ppm SO2). The second aspect describes a parametric study on engine bench concerning the sulfur effect on NOx trap efficiency and the required conditions (temperature, air/fuel ratio) to obtain different rates of desulfation. For instance, after 70 hours, NOx efficiency decreased from 90% to 25% with a sulfur content in gasoline of 110 ppm. Complete regeneration requires various durations of desulfation depending on air/fuel ratio (lambda=1 to 0.95) and temperature conditions (950 to 750° C.). For example, complete regeneration occurs after several minutes at lambda=1 and several sets of ten seconds at lambda=0.95 at 650° C. Results show that sulfur content close to EURO III gasoline standards is the main obstacle for the introduction of NOx adsorber catalyst in Europe. *Impact of Sulfur on Nox Trap Catalyst Activity Study of the Regeneration Conditions,* M. Guyon et al., Society of Automotive Engineers, 982607 (1998).

The conventional catalysts described above employing $NO_x$ storage components have the disadvantage under practical applications of suffering from long-term activity loss because of $SO_x$ poisoning of the $NO_x$ traps. The conventional $NO_x$ trap components employed in the catalysts tend to trap $SO_x$ and form very stable sulfates which require regeneration at 650° C. which is not practical for low temperature diesel exhaust. Accordingly, it is a continuing goal to develop NOx trap catalysts which can reversibly trap $SO_x$ present in the gaseous stream and thereby prevent $SO_x$ sulfur oxide poisoning of the $NO_x$ trap and can be regenerated at moderate temperatures with rich pulses, rather than at high temperatures.

SUMMARY OF THE INVENTION

The present invention pertains to a method for removing $NO_x$ contaminants from a SOx containing gaseous stream comprising the steps of:

(1) providing a catalyst composite;

(2) in a sorbing period, passing a lean gaseous stream comprising $NO_x$ and $SO_x$ within a sorbing temperature range through the catalyst composite to sorb at least some of the $NO_x$ contaminants and thereby provide a $NO_x$ depleted gaseous stream exiting the catalyst composite and to sorb and abate at least some of the $SO_x$ contaminants in the gaseous stream and thereby provide a $SO_x$ depleted gaseous stream exiting the catalyst composite;

(3) in a $NO_x$ desorbing and abating period, changing the lean gaseous stream to a rich gaseous stream to thereby reduce and desorb at least some of the $NO_x$ contaminants from the catalyst composite and thereby provide a reduced $NO_x$ enriched gaseous stream exiting the catalyst composite;

(4) in a SOx desorbing period, changing the lean gaseous stream to a rich gaseous stream and raising the temperature of the gaseous stream to within a desorbing temperature range to thereby reduce and desorb at least some of the $SO_x$ contaminants from the catalyst composite and thereby regenerate the catalyst composite and provide a reduced $SO_x$ enriched gaseous stream exiting the catalyst composite; and wherein the catalyst composite comprises:

(a) a platinum component;

(b) a support; and (c) a NOx sorbent component comprising a first metal oxide and a second metal oxide, wherein the metal in the first metal oxide is selected from the group consisting of aluminum, titanium, zirconium, silicon, and composites thereof, and the metal in the second metal oxide is selected from the group consisting of Group IIA metals, Group III metals, Group IV metals, rare earth metals, and transition metals; wherein the metal in the first metal oxide is different from the metal in the second metal oxide;

wherein the NOx sorbent component is prepared by a hydrothermal synthesis process comprising the steps of:

(i) providing an aqueous suspension or solution of the first and second metal oxides, or precursors thereof, or both, wherein the precursors of the first and second metal oxides are metal salts which when hydrolyzed produce the respective metal oxides;

(ii) subjecting the suspension or solution of the first and second metal oxides, or precursors thereof, to a temperature from about 150° C. to about 300° C. in an autoclave under pressure for a time sufficient to produce a precipitate having an average particle size from about 0.001 to about 0.2 micron in a mother liquor; and (iii) separating the precipitate from the mother liquor.

The present invention also pertains to a catalyst composite prepared by a hydrothermal synthesis method which comprises the steps of:

(i) providing an aqueous suspension or solution of a first metal oxide and a second metal oxide, or precursors thereof, or both, wherein the precursors of the first and second metal oxides are metal salts which when hydrolyzed produce the respective metal oxides;

(ii) subjecting the suspension or solution of the first and second metal oxides, or precursors thereof, to a temperature from about 150° C. to about 300° C. in an autoclave under pressure for a time sufficient to produce a precipitate having an average particle size from about 0.001 to about 0.2 micron in a mother liquor; and (iii) separating the precipitate from the mother liquor; and (iv) forming an admixture of the precipitate, a platinum component, and a support.

The present invention also pertains to a method of forming a catalyst composite which comprises the steps of:

(i) providing an aqueous suspension or solution of a first metal oxide and a second metal oxide, or precursors thereof, or both, wherein the precursors of the first and second metal oxides are metal salts which when hydrolyzed produce the respective metal oxides;

(ii) subjecting the suspension or solution of the first and second metal oxides, or precursors thereof, to a temperature from about 150° C. to about 300° C. in an autoclave under pressure for a time sufficient to produce a precipitate having an average particle size from about 0.001 to about 0.2 micron in a mother liquor; and (iii) separating the precipitate from the mother liquor; and (iv) forming an admixture of the precipitate, a platinum component, and a support.

The present invention also pertains to a method of forming a catalyst composite which comprises the steps of:

(1) forming an admixture of:

(a) a support; and (b) a NOx sorbent component;

(2) combining a water-soluble or dispersible platinum component and the admixture from step (1) with an aqueous liquid to form a solution or dispersion which is sufficiently dry to absorb essentially all of the liquid;

(3) forming a layer of the solution or dispersion on a substrate; and (4) converting the platinum component in the resulting layer to a water-insoluble form;

wherein the NOx sorbent component is prepared by a hydrothermal synthesis process comprising the steps of:

(i) providing an aqueous suspension or solution of a first metal oxide and a second metal oxide, or precursors thereof, or both, wherein the precursors of the first and second metal oxides are metal salts which when hydrolyzed produce the respective metal oxides;

(ii) subjecting the suspension or solution of the first and second metal oxides, or precursors thereof, to a temperature from about 150° C. to about 300° C. in an autoclave under pressure for a time sufficient to produce a precipitate having an average particle size from about 0.001 to about 0.2 micron in a mother liquor; and (iii) separating the precipitate from the mother liquor.

The sulfur tolerant NOx trap catalyst composites are highly effective with a sulfur containing fuel by trapping sulfur oxide contaminants in lean when conventional NOx trap catalysts tend to be poisoned, and release sulfur oxide contaminants in rich to regenerate the NOx trap. The sulfur tolerant NOx trap catalyst composites are particularly suitable for diesel engines because the composites can be regenerated at moderate temperatures with rich pulses, rather than at high temperatures.

DETAILED DESCRIPTION OF THE INVENTION AND SPECIFIC EMBODIMENTS THEREOF

The present invention relates to sulfur tolerant catalyst composites useful for reducing contaminants in exhaust gas streams, especially gaseous streams containing sulfur oxide contaminants. More specifically, the present invention is concerned with improved NOx trap catalysts for use in diesel engines as well as lean burn gasoline engines. The sulfur tolerant NOx trap catalyst composites comprise a platinum component, a support, and a NOx sorbent component prepared by hydrothermal synthesis. The NOx sorbent component comprises a first metal oxide and a second metal oxide. The metal in the first metal oxide is selected from the group consisting of aluminum, titanium, zirconium, silicon, and composites thereof, and the metal in the second metal oxide is selected from the group consisting of Group IIA metals, Group III metals, Group IV metals, rare earth metals, and transition metals. The metal in the first metal oxide is different from the metal in the second metal oxide. The sulfur tolerant NOx trap catalyst composites are highly effective with a sulfur containing fuel by trapping sulfur oxide contaminants which tend to poison conventional NOx trap catalysts used to abate other pollutants in the stream. The sulfur tolerant NOx trap catalyst composites are suitable for diesel engines because the composites can be regenerated at moderate temperatures with rich pulses, rather than at high temperatures. Conventional NOx trap catalysts are readily poisoned by sulfur and cannot be regenerated by rich pulses below 650° C. Since the exhaust temperature of diesel engines is low, the temperature requirement of 650° C. for regeneration and higher is not practical. The sulfur tolerant NOx trap catalyst composites of the present invention can be regenerated with rich pulses at moderate temperatures (550° C. or lower). Applicants believe that when the NOx sorbent components of the present invention are prepared by hydrothermal synthesis, the resulting NOx sorbent components are fine crystalline powders having sufficiently small average particle sizes (microparticles) such that the NOx sorbent components regenerate (desorb SOx) faster than NOx sorbent components not prepared by hydrothermal synthesis.

The improved NOx trap catalysts are sulfur tolerant and can be employed in a lean/rich environment containing sulfur for an extended period of time. Accumulated sulfur in the NOx trap catalysts can thereafter be released at a temperature that is easily reachable under the engine operation conditions, for example, 550° C. or lower. Thus, the NOx trap catalysts can be used in a sulfur containing environment continuously provided they are regenerated periodically. If sulfur can be released under normal engine working conditions, then sulfur is automatically being regenerated without additional efforts and the NOx trap catalyst becomes a truly sulfur resistant NOx trap.

The NOx trap materials of the present invention are generated by a hydrothermal synthesis process so as to yield ultra fine sub-micron mixed oxide composites. While not wishing to be held to a mechanism, it is believed that ultra fine sub-micron mixed oxides are more active than the large, greater than 1 micron size, bulk phase materials that are produced by conventional processes. It is further believed that the reductant can more effectively clean the surface to regenerate new adsorption sites, onto which nitrates and sulfates adsorb and the bulk oxide takes longer to regenerate because of diffusion limitation in the rapid regeneration needed. On a diesel engine, a bulk NOx trap composite can not be fully 'scrubbed' of sulfur in the short regeneration cycle. Therefore, it becomes quickly poisoned. Conversely, the oxides produced from the hydrothermal method regenerate more effectively.

A fresh SOx trap should clear SOx before it reaches the NOx trap located downstream. However, any SOx trap has limited capacity. Many problems exist when a separated SOx trap is used together with a NOx trap. A higher temperature is needed to regenerate the SOx trap, the released SOx in the gas flow must be avoided to poison the NOx trap that is located down stream, engine management becomes more complicated, and the pollutant abatement system becomes complicated. The present invention provides a trap that not only traps NOx and SOx but also releases SOx when NOx is released during the NOx regeneration so that some sites that have been trapping SOx are also regenerated at the same time. In other words, the SOx tolerant NOx trap may not require a higher temperature to be regenerated after being sulfated in the SOx environment. As an option, a separate SOx trap is not needed, the NOx and SOx trap may be combined. A lean burn or diesel catalyst equipped with a NOx/SOx trap can be regenerated similar to regenerating a simple NOx trap in a sulfur free environment.

With the SOx tolerant NOx trap of the present invention, one may operate the pollutant abating system without the need of a higher temperature for SOx desorbing, and/or a separate SOx desorbing period. The SOx tolerant NOx trap can also work continuously at a moderate temperate (e.g. 300° C.) without raising the temperature for trap regeneration (only lean/rich alternative required).

The present invention includes a method of making SOx tolerant NOx traps through the selection of the right mixed oxides prepared by hydrothermal synthesis. After being sulfated, the SOx tolerant NOx trap can be fully regenerated at a temperature as low as 400° C. Barium oxide type NOx traps cannot be regenerated at such a low temperature. After being extensively sulfated for a continuous 68 hours (the amount of SOx passed through equaled the same amount of the trap material), the NOx conversion was still effective. The SOx tolerant NOx trap worked effectively without any temperature rising for trap regeneration (only lean/rich alternative required).

A catalyst adsorbs or traps NOx when the exhaust gas is lean and releases the stored NOx when the exhaust stream is rich. The released NOx is subsequently reduced to $N_2$ over the same catalyst. The rich environment in a diesel engine is normally realized with a rich pulse generated by either engine management or injection of reducing agents (such as fuel, or a CO or $CO/H_2$ mixture) into the exhaust pipe. The timing and frequency of the rich pulse is determined by the NOx level emitted from the engine, the richness of the exhaust, or the concentration of the reductant in the rich pulse and the NOx conversion desired. Normally, the longer the lean period, the longer the rich pulse is needed. The need for longer rich pulse timing may be compensated by higher concentration of the reductant in the pulse. Overall, the quantity of the NOx trapped by the NOx trap should be balanced by the quantity of the reductant in the rich pulse. The lean NOx trapping and rich NOx trap regeneration are operative at normal diesel operating temperatures (150–450° C.). Beyond this temperature window, the efficiency of the NOx trap catalyst becomes less effective. In a sulfur containing exhaust stream, the catalyst becomes deactivated over time due to sulfur poisoning. To regenerate the sulfur-poisoned NOx trap, a rich pulse (or pulses) must be applied at temperatures higher than the normal diesel operating temperature. The regeneration time of the generation depends on the sulfur level in the exhaust (or fuel sulfur level) and the length of the catalyst had exposed to the sulfur-containing stream. The quantity of the reductant added during the desulfation should counterbalance the total amount of sulfur trapped in the catalyst. Engine operability will determine whether a single long pulse or multiple short pulses are employed.

As used herein, the following terms, whether used in singular or plural form, have the meaning defined below.

The term "catalytic metal component", or "platinum metal component", or reference to a metal or metals comprising the same, means a catalytically effective form of the metal or metals, whether the metal or metals are present in elemental form, or as an alloy or a compound, e.g., an oxide.

The term "component" or "components" as applied to $NO_x$ sorbents means any effective $NO_x$-trapping forms of the metals, e.g., oxygenated metal compounds such as metal hydroxides, mixed metal oxides, metal oxides or metal carbonates.

The term "composite" means bimetallic or multi-metallic oxygen compounds, such as $Ba_2SrWO_6$, which are true compounds as well as physical mixtures of two or more individual metal oxides, such as a mixture of SrO and BaO.

The term "dispersed", when applied to a component dispersed onto a bulk support material, means immersing the bulk support material into a solution or other liquid suspension of the component or a precursor thereof. For example, the sorbent strontium oxide may be dispersed onto an alumina support material by soaking bulk alumina in a solution of strontium nitrate (a precursor of strontia), drying the soaked alumina particles, and heating the particles, e.g., in air at a temperature from about 450° C. to about 750° C. (calcining) to convert the strontium nitrate to strontium oxide dispersed on the alumina support materials.

The term "gaseous stream" or "exhaust gas stream" means a stream of gaseous constituents, such as the exhaust of an internal combustion engine, which may contain entrained non-gaseous components such as liquid droplets, solid particulates, and the like.

The terms "g/in$^3$" or "g/ft$^3$" are used to describe weight per volume units describe the weight of a component per volume of catalyst or trap member including the volume attributed to void spaces such as gas-flow passages.

The term "lean" mode or operation of treatment means that the gaseous stream being treated contains more oxygen that the stoichiometric amount of oxygen needed to oxidize the entire reductants content, e.g., HC, CO and $H_2$, of the gaseous stream.

The term "platinum group metals" means platinum, rhodium, palladium, ruthenium, iridium, and osmium.

The term "sorb" means to effect sorption.

The term "stoichiometric/rich" mode or operation of treatment means that the gaseous stream being treated refers collectively to the stoichiometric and rich operating conditions of the gas stream.

The term "washcoat" has its usual meaning in the art of a thin, adherent coating of a catalytic or other material applied to a refractory carrier material, such as a honeycomb-type carrier member, which is sufficiently porous to permit the passage there through of the gas stream being treated.

In accord with the present invention, a method is provided for removing $NO_x$ contaminants from a SOx containing gaseous stream. The method comprises (1) providing a catalyst composite; (2) in a sorbing period, passing a lean gaseous stream comprising $NO_x$ and $SO_x$ within a sorbing temperature range through the catalyst composite to sorb at least some of the $NO_x$ contaminants and thereby provide a $NO_x$ depleted gaseous stream exiting the catalyst composite and to sorb and abate at least some of the $SO_x$ contaminants in the gaseous stream and thereby provide a $SO_x$ depleted gaseous stream exiting the catalyst composite; (3) in a $NO_x$ desorbing and abating period, changing the lean gaseous stream to a rich gaseous stream to thereby reduce and desorb at least some of the $NO_x$ contaminants from the catalyst composite and thereby provide a reduced $NO_x$ enriched gaseous stream exiting the catalyst composite; (4) in a SOx desorbing period, changing the lean gaseous stream to a rich gaseous stream and raising the temperature of the gaseous stream to within a desorbing temperature range to thereby reduce and desorb at least some of the $SO_x$ contaminants from the catalyst composite and thereby regenerate the catalyst composite and provide a reduced $SO_x$ enriched gaseous stream exiting the catalyst composite. The catalyst composite comprises (a) a platinum component; (b) a support; and (c) a NOx sorbent component comprising a first metal oxide and a second metal oxide, wherein the metal in the first metal oxide is selected from the group consisting of aluminum, titanium, zirconium, silicon, and composites thereof, and the metal in the second metal oxide is selected from the group consisting of Group IIA metals, Group III metals, Group IV metals, rare earth metals, and transition metals; wherein the metal in the first metal oxide is different from the metal in the second metal oxide. The NOx sorbent component is prepared by a hydrothermal synthesis process comprising the steps of (i) providing an aqueous suspension or solution of the first and second metal oxides, or precursors thereof, or both, wherein the precursors of the first and second metal oxides are metal salts which when hydrolyzed produce the respective metal oxides; (ii) subjecting the suspension or solution of the first and second metal oxides, or precursors thereof, to a temperature from about 150° C. to about 300° C. in an autoclave under pressure for a time sufficient to produce a precipitate having an average particle size from about 0.001 to about 0.2 micron in a mother liquor; and (iii) separating the precipitate from the mother liquor.

In general, the SOx desorbing temperature range is greater than about 300° C., preferably, the desorbing temperature range is greater than about 350° C., more preferably, the desorbing temperature range is greater than about 400° C., and most preferably the desorbing temperature range is greater than about 450° C. The SOx desorbing temperature may also be greater than about 500° C., preferably greater than about 550° C., more preferably greater than about 600° C., and most preferably greater than about 650° C.

As set out above, the sulfur tolerant catalyst composite of the present invention includes a platinum component, and optionally a platinum group metal component other than platinum. The optional platinum group metal component other than platinum may be selected from the group consisting of palladium, rhodium, ruthenium, iridium, and osmium components. The preferred platinum group metal component other than platinum is selected from the group consisting of palladium, rhodium, and mixtures thereof.

The sulfur tolerant catalyst composite of the present invention also includes a support made of a high surface area refractory oxide support. The support may be selected from the group consisting of alumina, silica, titania, and zirconia compounds. Useful high surface area supports include one or more refractory oxides. These oxides include, for example, silica and metal oxides such as alumina, including mixed oxide forms such as silica-alumina, aluminosilicates which may be amorphous or crystalline, alumina-zirconia, alumina-chromia, alumina-ceria and the like. Preferably the support is an activated compound selected from the group consisting of activated alumina, alumina-ceria, alumina-chromia, alumina-silica, alumina-zirconia, silica, silica-titania, silica-titania-alumina, silica-titania-zirconia, titania, zirconia, zirconia-titania, and zirconia-alumina-titania. Desirably, the active alumina has a specific surface area of 60 to 300 m$^2$/g.

The sulfur tolerant catalyst composite of the present invention also includes a $NO_x$ sorbent component. The NOx sorbent component comprises a first metal oxide and a second metal oxide. The metal in the first metal oxide is selected from the group consisting of aluminum, titanium, zirconium, silicon, and composites thereof. The metal in the second metal oxide is selected from the group consisting of Group IIA metals, Group III metals, Group IV metals, rare earth metals, and transition metals. The metal in the first metal oxide is different from the metal in the second metal oxide. Preferably, the metal in the second metal oxide is selected from the group consisting of magnesium, calcium, strontium, barium, scandium, titanium, zirconium, hafnium, lanthanum, cerium, praseodymium, neodymium, samarium, europium, gadolinium, terbium, dysprosium, holmium, erbium, thulium, ytterbium, vanadium, chromium, manganese, iron, cobalt, nickel, copper, and zinc. More preferably, the metal in the second metal oxide is selected from the group consisting of barium, lanthanum, cerium, iron, cobalt, and copper. In a specific embodiment, the metals in the first and second metal oxides are selected from the group consisting of aluminum/cerium/barium, aluminum/copper/lanthanum, aluminum/cobalt/lanthanum, and iron/aluminum.

As set out above, the NOx sorbent component is prepared by a hydrothermal synthesis process which employs an aqueous suspension or solution of the first and second metal oxides, or precursors thereof, or both. The precursors of the first and second metal oxides are metal salts when hydrolyzed produce the respective metal oxides. Preferred precursors of the first metal oxide and second metal oxide are water-soluble/dispersible metal salts selected from the group consisting of acetates, nitrates, hydroxides, oxychlorides, hydroxychlorides, carbonates, sulfates, oxalates, and tartrates.

The metal in the first metal oxide and the metal in the second metal oxide are preferably present in a ratio from about 3:7 to about 9:1, more preferably from about 4:6 to about 8.5:1.5, respectively, and most preferably from about 5:5 to about 7.5:2.5, respectively.

As set out above, the NOx sorbent component is prepared by hydrothermal synthesis. In general, the process comprises the steps of (i) providing an aqueous suspension or solution of the at least 2 metal oxides, or precursors thereof, wherein the precursors of the at least 2 metal oxides are metal salts which when hydrolyzed produce the respective metal oxides; (ii) subjecting the suspension or solution of the at least 2 metal oxides, or precursors thereof, to a temperature from about 150° C. to about 300° C. in an autoclave under pressure for a time sufficient to produce a precipitate having an average particle size from about 0.001 to about 0.2 micron in a mother liquor; and (iii) separating the precipitate from the mother liquor.

The suspension of metal hydroxides is preferably subjected to a temperature from about 175° C. to about 250° C., preferably from about 185° C. to about 240° C. The precipitate preferably has an average particle size from about 0.01 to about 0.2 micron, preferably from about 0.05 to about 0.15 micron.

In a preferred embodiment, the catalyst composite comprises (i) at least about 1 g/ft$^3$ of the platinum component; (ii) from about 0.15 g/in$^3$ to about 6.0 g/in$^3$ of the support; and (iii) from about 0.025 g/in$^3$ to about 4 g/in$^3$ of the $NO_x$ sorbent component.

The catalyst composite may be supported on a metal or ceramic honeycomb carrier or is self-compressed.

The NOx sorbent component may further comprise a third metal oxide, wherein the metal in the third metal oxide is selected from the group consisting of aluminum, titanium, zirconium, silicon, and composites thereof, and the metal in the second metal oxide is selected from the group consisting of Group IIA metals, Group III metals, Group IV metals, rare earth metals, and transition metals. In this embodiment, the metal in the third metal oxide is different from the metal in the first and second metal oxides.

In accordance with the present invention, NOx sorbent components are prepared by hydrothermal synthesis to yield fine powders. In general, the NOx sorbent components are prepared by providing an aqueous suspension or solution of the first and second metal oxides, or precursors thereof, or both, subjecting the suspension or solution of the first and second metal oxides, or precursors thereof, to a temperature from about 150° C. to about 300° C. in an autoclave under pressure for a time sufficient to produce a precipitate having an average particle size from about 0.001 to about 0.2 micron in a mother liquor, and separating the precipitate from the mother liquor.

The precursor solution/suspension is subsequently subjected to hydrothermal reaction with stirring to provide a fine precipitate. The reaction may be carried out in an autoclave, which is preferably made of stainless steel coated with heat-resistant high polymer, such as polytetrafluoroethylene. The precipitate produced by the hydrothermal reaction at a temperature from about 150° C. to about 300° C. generally has an average particle size between 0.001 and 0.2 micron. The precipitate may be separated from the mother liquor by filtration, then washed and dried.

In a preferred embodiment, the NOx sorbent component is prepared by a process comprising the steps of (i) providing an aqueous suspension or solution of the at least 2 metal oxides, or precursors thereof, or both, wherein the precursors of the at least 2 metal oxides are metal salts which when hydrolyzed produce the respective metal oxides; (ii) subjecting the suspension or solution of the at least 2 metal oxides, or precursors thereof, to a temperature from about 150° C. to about 300° C. in an autoclave under pressure for a time sufficient to produce a precipitate having an average particle size from about 0.001 to about 0.2 micron in a mother liquor; and (iii) separating the precipitate from the mother liquor.

In use, the exhaust gas stream, comprising air, water, hydrocarbons, carbon monoxide, nitrogen oxides, and sulfur oxides and which is contacted with the catalyst composite of the present invention, is alternately adjusted between lean and stoichiometric/rich operating conditions so as to provide alternating lean operating periods and stoichiometric/rich operating periods. The exhaust gas stream being treated may be selectively rendered lean or stoichiometric/rich either by adjusting the air-to-fuel ratio fed to the engine generating the exhaust or by periodically injecting a reductant into the gas stream upstream of the catalyst. For example, the catalyst composite of the present invention is well suited to treat the exhaust of engines, especially diesel engines, which continuously run lean. In a diesel engine, in order to establish a stoichiometric/rich operating period, a suitable reductant, such as fuel, may be periodically sprayed into the exhaust immediately upstream of the catalytic trap of the present invention to provide at least local (at the catalytic trap) stoichiometric/rich conditions at selected intervals. Partial lean-burn engines, such as partial lean-burn gasoline engines, are designed with controls which cause them to operate lean with brief, intermittent rich or stoichiometric conditions. In practice, the sulfur tolerant NOx trap catalyst composite absorbs in-coming $SO_x$ during a lean mode operation (100° C. to 500° C.) and desorbs $SO_x$ (regenerate) during a rich mode operation (greater than about 300° C., preferably greater than about 350° C., more preferably greater than about 400° C., and most preferably greater than about 450° C. The SOx desorbing temperature may also be greater than about 500° C., preferably greater than about 550° C., more preferably greater than about 600° C., and most preferably greater than about 650° C. When the exhaust gas temperature returns to a lean mode operation (100° C. to 500° C.), the regenerated sulfur tolerant NOx trap catalyst composite will again selectively absorb in-coming $SO_x$. The duration of the lean mode may be controlled so that the sulfur tolerant NOx trap catalyst composite will not be saturated with $SO_x$.

When the composition is applied as a thin coating to a monolithic carrier substrate, the proportions of ingredients are conventionally expressed as grams of material per cubic inch ($g/in^3$) of the catalyst and the substrate. This measure accommodates different gas flow passage cell sizes in different monolithic carrier substrates. Platinum group metal components are based on the weight of the platinum group metal.

A useful and preferred sulfur tolerant NOx trap catalyst composite has at least about 1 $g/ft^3$ of a platinum component; from about 0.15 $g/in^3$ to about 4.0 $g/in^3$ of a support; at least about 1 $g/ft^3$ of a platinum group metal component other than platinum; from about 0.025 $g/in^3$ to about 4 $g/in^3$ of a $NO_x$ sorbent component.

The specific construction of the catalyst composite set out above results in an effective catalyst that reversibly traps sulfur oxide contaminants present and thereby prevents the sulfur oxide contaminants from poisoning the NOx trap catalysts for use in diesel engines. The catalyst composite can be in the form of a self-supported article such as a pellet, and more preferably, the sulfur tolerant NOx trap catalyst composite is supported on a carrier, also referred to as a substrate, preferably a honeycomb substrate. A typical so-called honeycomb-type carrier member comprises a material such as cordierite or the like, having a plurality of fine, gas-flow passages extending from the front portion to the rear portion of the carrier member. These fine gas-flow passages, which may number from about 100 to 900 passages or cells per square inch of face area ("cpsi"), have a catalytic trap material coated on the walls thereof.

The present invention also includes a method for treating an exhaust gas stream which comprises the step of contacting the gas stream comprising carbon monoxide and/or hydrocarbons, nitrogen oxides, and sulfur oxides with the catalyst composite set out above. The present invention also includes a method of treating an exhaust gas stream comprising the steps of contacting the stream with the catalyst composite set out above under alternating periods of lean and stoichiometric or rich operation. Contacting is carried out under conditions whereby at least some of the $SO_x$ in the exhaust gas stream is trapped in the catalytic material during the periods of lean operation and is released and reduced during the periods of stoichiometric or rich operation.

In a specific embodiment, the present invention pertains to a catalyst composite prepared by a hydrothermal synthesis method which comprises the steps of:

(i) providing an aqueous suspension or solution of a first metal oxide and a second metal oxide, or precursors thereof, or both, wherein the precursors of the first and second metal oxides are metal salts which when hydrolyzed produce the respective metal oxides;

(ii) subjecting the suspension or solution of the first and second metal oxides, or precursors thereof, to a temperature from about 150° C. to about 300° C. in an autoclave under pressure for a time sufficient to produce a precipitate having an average particle size from about 0.001 to about 0.2 micron in a mother liquor; and (iii) separating the precipitate from the mother liquor; and (iv) forming an admixture of the precipitate, a platinum component, and a support.

The present invention also pertains to a method of forming a catalyst composite which comprises the steps of:

(i) providing an aqueous suspension or solution of a first metal oxide and a second metal oxide, or precursors thereof, or both, wherein the precursors of the first and second metal oxides are metal salts which when hydrolyzed produce the respective metal oxides;

(ii) subjecting the suspension or solution of the first and second metal oxides, or precursors thereof, to a temperature from about 150° C. to about 300° C. in an autoclave under pressure for a time sufficient to produce a precipitate having an average particle size from about 0.001 to about 0.2 micron in a mother liquor; and (iii) separating the precipitate from the mother liquor; and (iv) forming an admixture of the precipitate, a platinum component, and a support.

The present invention also pertains to a method of forming a catalyst composite which comprises the steps of:

(1) forming an admixture of:
  (a) a support; and
  (b) a NOx sorbent component;

(2) combining a water-soluble or dispersible platinum component and the admixture from step (1) with an aqueous liquid to form a solution or dispersion which is sufficiently dry to absorb essentially all of the liquid;

(3) forming a layer of the solution or dispersion on a substrate; and (4) converting the platinum component in the resulting layer to a water-insoluble form;

wherein the NOx sorbent component is prepared by a hydrothermal synthesis process comprising the steps of:

(i) providing an aqueous suspension or solution of a first metal oxide and a second metal oxide, or precursors thereof, or both, wherein the precursors of the first and second metal oxides are metal salts which when hydrolyzed produce the respective metal oxides;

(ii) subjecting the suspension or solution of the first and second metal oxides, or precursors thereof, to a temperature from about 150° C. to about 300° C. in an autoclave under pressure for a time sufficient to produce a precipitate having an average particle size from about 0.001 to about 0.2 micron in a mother liquor; and (iii) separating the precipitate from the mother liquor.

The sulfur tolerant NOx trap catalyst composites are highly effective with a sulfur containing fuel by trapping sulfur oxide contaminants which tend to poison conventional NOx trap catalysts used to abate other pollutants in the stream. The sulfur tolerant NOx trap catalyst composites are suitable for diesel engines because the composites can be regenerated at moderate temperatures with rich pulses, rather than at high temperatures.

The sulfur tolerant catalyst composite may optionally comprise conventional components known in the art.

In order to deposit the coat slurries on a macrosized carrier, one or more comminuted slurries are applied to the carrier in any desired manner. Thus the carrier may be dipped one or more times in the slurry, with intermediate drying if desired, until the appropriate amount of slurry is on the carrier. The slurry employed in depositing the catalytically-promoting metal component-high area support composite on the carrier will often contain about 20% to 60% by weight of finely-divided solids, preferably about 25% to 55% by weight.

The sulfur tolerant catalyst composite of the present invention can be prepared and applied to a suitable substrate, preferably a metal or ceramic honeycomb carrier, or may be self-compressed. The comminuted catalytically-promoting metal component-high surface area support composite can be deposited on the carrier in a desired amount, for example, the composite may comprise about 2% to 40% by weight of the coated carrier, and is preferably about 5% to 30% by weight for a typical ceramic honeycomb structure. The composite deposited on the carrier is generally formed as a coating over most, if not all, of the surfaces of the carrier contacted. The combined structure may be dried and calcined, preferably at a temperature of at least about 250° C. but not so high as to unduly destroy the high area of the refractory oxide support, unless such is desired in a given situation.

The carriers useful for the catalysts made by this invention may be metallic in nature and be composed of one or more metals or metal alloys. The metallic carriers may be in various shapes such as corrugated sheet or in monolithic form. Preferred metallic supports include the heat-resistant, base-metal alloys, especially those in which iron is a substantial or major component. Such alloys may contain one or more of nickel, chromium, and aluminum, and the total of these metals may advantageously comprise at least about 15% by weight of the alloy, for instance, about 10% to 25% by weight of chromium, about 3% to 8% by weight of aluminum and up to about 20% by weight of nickel, say at least about 1% by weight of nickel, if any or more than a trace amount be present. The preferred alloys may contain small or trace amounts of one or more other metals such as manganese, copper, vanadium, titanium and the like. The surfaces of the metal carriers may be oxidized at quite elevated temperatures, e.g. at least about 1000° C., to improve the corrosion resistance of the alloy by forming an oxide layer on the surface of carrier which is greater in thickness and of higher surface area than that resulting from ambient temperature oxidation. The provision of the oxidized or extended surface on the alloy carrier by high temperature oxidation may enhance the adherence of the refractory oxide support and catalytically-promoting metal components to the carrier.

Any suitable carrier may be employed, such as a monolithic carrier of the type having a plurality of fine, parallel gas flow passages extending there through from an inlet or an outlet face of the carrier, so that the passages are open to fluid flow there through. The passages, which are essentially straight from their fluid inlet to their fluid outlet, are defined by walls on which the catalytic material is coated as a "washcoat" so that the gases flowing through the passages contact the catalytic material. The flow passages of the monolithic carrier are thin-walled channels which can be of any suitable cross-sectional shape and size such as trapezoidal, rectangular, square, sinusoidal, hexagonal, oval, circular. Such structures may contain from about 60 to about 600 or more gas inlet openings ("cells") per square inch of cross section. The ceramic carrier may be made of any suitable refractory material, for example, cordierite, cordierite-alpha alumina, silicon nitride, zircon mullite, spodumene, alumina-silica magnesia, zircon silicate, sillimanite, magnesium silicates, zircon, petalite, alpha alumina and aluminosilicates. The metallic honeycomb may be made of a refractory metal such as a stainless steel or other suitable iron based corrosion resistant alloys.

The substrate can comprise a monolithic honeycomb comprising a plurality of parallel channels extending from the inlet to the outlet. The monolith can be selected from the group of ceramic monoliths and metallic monoliths. The honeycomb can be selected from the group comprising flow through monoliths and wall flow monoliths. Such monolithic carriers may contain up to about 700 or more flow channels ("cells") per square inch of cross section, although far fewer may be used. For example, the carrier may have from about 60 to 600, more usually from about 200 to 400, cells per square inch ("cpsi"). The sulfur tolerant catalyst composite can be coated in layers on a monolithic substrate generally which can comprise from about 0.50 $g/in^3$ to about 6.0 $g/in^3$, preferably about 1.0 $g/in^3$ to about 5.0 $g/in^3$ of catalytic composition based on grams of composition per volume of the monolith.

The present invention includes a method comprising passing an inlet end fluid comprising an inlet end coating composition into a substrate as recited above. For the purpose of the present invention a fluid includes liquids, slurries, solutions, suspensions and the like. The aqueous liquid passes into the channel inlets and extending for at least part of the length from the inlet end toward the outlet end to form an inlet end layer coating, with at least one inlet end coating extending for only part of the length from the inlet end toward the outlet end. A vacuum is applied to the outlet end while forcing a gas stream through the channels from the inlet end after the formation of each inlet end coating without significantly changing the length of each inlet layer coating. At least one outlet end aqueous fluid comprising at least one outlet end coating composition is passed into the substrate through the at least some of the channel outlets at the substrate outlet end. The aqueous liquid passes into the channels and extending for at least part of the length from the outlet end toward the inlet end to form at least one outlet end layer coating. The method can further comprise applying a vacuum to the inlet end while forcing a gas stream through the channels from the outlet end after the formation of each outlet end coating without significantly changing the length of each outlet layer coating.

The method can further comprise the step of fixing the precious metal component selected from the inlet precious metal component of the inlet layer and the outlet precious metal component of the outlet layer to the respective inlet or outlet component selected from the inlet refractory oxide and inlet rare earth metal oxide components and the outlet refractory oxide and outlet rare earth metal oxide components. The fixing can be conducted prior to coating the inlet and outlet layers. The step of fixing can comprise chemically fixing the precious metal component on the respective refractory oxide and/or rare earth metal oxide. Alternatively, the step of fixing can comprise thermally treating the precious metal component on the respective refractory oxide and/or rare earth metal oxide. The step of fixing comprises calcining the precious metal component on the respective refractory oxide and/or rare earth metal oxide. The step of calcining can be conducted at from 200° C., preferably 250° C. to 900° C. at from 0.1 to 10 hours. The steps of thermally fixing each layer are preferably conducted after coating and prior to coating a subsequent layer. The step of thermally treating the substrate upon completion of coating all layers at from 200° C. to 400° C. at from 1 to 10 seconds. The steps of calcining is preferably the substrate conducted upon completion of coating all layers. The step of calcining is conducted at from 250° C. to 900° C. at from 0.1 to 10 hours.

Preferably, the precious metal can be prefixed on the supports. Alternatively the method further comprises fixing the soluble components in the layer such as one precious metal component to one of the refractory oxide or rare earth metal oxide components, the fixing being conducted prior to coating the layers. The step of fixing can comprise chemically fixing the precious metal on the respective refractory oxide and/or rare earth metal oxide. More preferably, the step of fixing comprises thermally treating the precious metal on the refractory oxide and/or rare earth metal oxide. The step of thermally treating the substrate upon completion of coating one or more layers at from 200° C. to 400° C. at from 1 to 10, and preferably 2 to 6 seconds. The heat is provided by forcing a gas stream, preferably air which is heated to from 200° C. to 400° C. This temperature range has been found to substantially fix the soluble components such as precious metal components. The combination of flow rate and temperature of the gas stream should be sufficient to heat the coating layer and preferably, providing a minimum of heat to the underlying substrate to enable rapid cooling in the subsequent cooling step prior to application of subsequent layers. Preferably, the steps of thermally fixing each layer, preferably followed by cooling with ambient air, are conducted after coating and prior to coating a subsequent layer. The cooling step is preferably conducted using ambient air typically at from 5° C. to 40° C. at from 2 to 20, and preferably 4 to 10 seconds at a suitable flow rate. The combination of the ambient air flow rate and temperature of the gas stream should be sufficient to cool the coating layer. This method permits continuous coating of a plurality of layers on a substrate to form the above described article of the present invention. A preferred method comprises the step of fixing the precious metal component to the refractory oxide and rare earth metal oxide components, the fixing being conducted prior to coating the first and second layers.

In yet another embodiment the method comprises the step of applying a vacuum to the partially immersed substrate at an intensity and a time sufficient to draw the coating media upwardly to a predesignated distance from the bath into each of the channels to form a uniform coating profile therein for each immersion step. Optionally, and preferably the substrate can be turned over to repeat the coating process from the opposite end. The coated substrate should be thermally fixed after forming the layer.

The method can include a final calcining step. This can be conducted in an oven between coating layers or after the coating of all the layers on the substrate has been completed. The calcining can be conducted at from 250° C. to 900° C. at from 0.1 to 10 hours and preferably from 450° C. to 750° C. at from at from 0.5 to 2 hours. After the coating of all layers is complete the substrate can be calcined.

A method aspect of the present invention provides a method for treating a gas containing noxious components comprising one or more of carbon monoxide, hydrocarbons and nitrogen oxides, by converting at least some of each of the noxious components initially present to innocuous substances such as water, carbon dioxide and nitrogen. The method comprises the step of contacting the gas under conversion conditions (e.g., a temperature of about 100° C. to 950° C. of the inlet gas to the catalyst composition) with a catalyst composition as described above.

The following examples are provided to further illustrate various embodiments of this invention and to provide a comparison between the enumerated catalysts of this invention and prior art catalysts. The examples are provided to illustrate the nature of the claimed process and are not intended to limit the scope of the claimed invention. Unless otherwise stated, parts and percentages in the examples are given by weight.

EXAMPLES

Preparation of Sulfur Tolerant NOx Trap Materials

Example 1 (E1)

Weighed the following precursors: Aluminum acetate Al—Ac (Boehmite, AlOOH, containing 65.4 wt % $Al_2O_3$) 1422.02 g; Barium acetate Ba—Ac (containing BaO 60 wt %) 625 g; cerium nitrate Ce—N aqueous solution (containing $CeO_2$ 30.6 wt %) 637.2 g.

Barium acetate was first dissolved in deionized water. Cerium nitrate was also dissolved in deionized water. The solution had a pH of 7.62. Al—Ac was added into the Ba—Ac solution under constant stirring. Deionized water was added and the final slurry had a pH of 6.32. Cerium nitrate solution was added into the slurry. Continued to mix for 1 hour, and pH dropped to 5.75. The slurry started to gel. Mixing was continued overnight and the gel thickened like jelly. Additional deionized water was added to the gel to thin it and to bring the total volume to 12 liters. The gel was transferred to a 5-gallon autoclave for hydrothermal synthesis.

The autoclave was heated to 232° C., kept at 232° C. for 2 hours, then cooled down to room temperature. Soaked at room temperature for 60 hours, the autoclave was heated up to 230° C. The hydrothermal process at 230° C. was continued for 48 hours, then cooled down to room temperature.

The product was centrifuged. The mother liquor had a pH of 4.68. The precipitate was washed with deionized water and centrifuged again. The product was dried overnight and calcined at 550° C. for 2 hours in a box furnace. The final product had a BET surface area of 62 $m^2/g$. XRF semi quantitative analysis indicated the final composite to be 84.7 wt % $Al_2O_3$—11.5 wt % $CeO_2$—2.4 wt % BaO.

Example 2 (E2)

Trap material E2 was made by hydrothermal synthesis and prepared as follows. Weighed the following precursors: 45.04 g of aluminum acetate Al—Ac (Boehmite, AlOOH, containing 65.4 wt % $Al_2O_3$); 44.59 g of cobalt nitrate Co—N (containing 22.5 wt % of CoO); and 34.135 g of lanthanum nitrate La—N solution (containing 27.1 wt % $La_2O_3$).

Co—N was dissolved in La—N solution, deionized water was added to completely dissolve the Co salt. The final solution had a pH of 1.23. Al—Ac was added into 250 g of deionized water under constant stirring. The slurry had a pH of 5.29. The nitrate solution was added into the slurry under vigorous stirring. Gradually the mixed slurry started to gel. At this stage, the measured pH was 4.96. Ammonia of 10% concentration was added dropwise, until pH increased to 7.60 and the color of the gel turned to blue-green. Transferred the gel into autoclave. The hydrothermal synthesis was processed for 64 hours at 250° C. The product was washed and centrifuged, then dried and calcined at 550° C. for 2 hours. XRF semi quantitative resulted in 79 wt % $Al_2O_3$—19 wt % $Co_3O_4$—1 wt % $La_2O_3$.

Example 3 (E3)

The sample was made by hydrothermal synthesis. The composition of the sample was (XRF) 25.2 wt % BaO—11.0 wt % $CeO_2$—63.8 wt % $Al_2O_3$.

Example 4 (E4)

The sample was made by hydrothermal synthesis. The nominal composition of the sample was 25 wt % SrO—32 wt % $TiO_2$—43 wt % $Al_2O_3$.

Example 5 (E5)

This is a sample whose composition is the same as sample Example 3 but not made by hydrothermal synthesis. Example 5 was made by co-precipitation. Precursors cerium nitrate (39.63 wt % $CeO_2$), barium acetate (60.6 wt % BaO), aluminum acetate (65.5 wt % $Al_2O_3$), were used. Al—Ac was added into the Ba—Ac aqueous solution under vigorous stirring to make a slurry. Acetic acid was added dropwise into the slurry. pH decreased to between 6 and 5, and the slurry started to gel. Ce—N solution was added into the gel under stirring. Acetic acid was added and pH approached 5. The gel was transferred into a crucible and dried at 150° C. overnight. The dried material was ground and sieved to 250 um. The granules were calcined at 300C for 4 hours then 450° C. for 6 hours.

Preparation of the Trap Testing Samples for Mini-Reactor Examples of NOx Trap Testing Samples (Samples T1 to T5)

Sample preparation: The above materials (E1 to E5) were impregnated with anionic Pt solution to obtain 1 wt % of Pt loading dispersed on the trap material. The impregnated sample was dried and calcined at 450° C. for 1 hour to form dry chunks. The chunks were crushed and sieved to obtain particles of diameter of average 300 um grains. Thus, corresponding to the trap materials E1 to E5, trapping test samples were obtained and designated as T1 to T5 what were 300 um granular particles loaded with 1 wt % Pt.

Test Methods of NOx Trapping and Sulfur Regeneration
Testing Protocol and CO Injection Mode Lean gas flow was used to load the trap with NOx and SOx; rich flow was used to release NOx (and SOx) and regenerate sulfur from the sample. Synchronized valves were used to simultaneously close/open O2/CO gas lines to inject CO (or vise versa to inject O2).

| | $O_2$ | NO | CO | $N_2$ | $SO_2$ |
|---|---|---|---|---|---|
| Rich | 0 | 500 ppm | 2.2% | balance | 60 ppm |
| Lean | 10% | 500 ppm | 0 | balance | 60 ppm |

The Lean/Rich cycle was set alternatively at 5 minutes lean and 5 seconds rich with VHSV 50,000/hr. or 25,000/hr.

Note that a high level of SOx (60 ppm) was used in this test. Modern commercial diesel fuel containing 350 ppm sulfur would generate 20 ppm SO2 in the exhaust gas stream. Hence, the 60 ppm SOx level used in this test is 3 times that expected in modern commercial diesel fuel.

NOx and SOx base lines were determined first with an empty tube prior to the test. Sample of the trap material was loaded in the reactor tube with a 50:50 mixture with cordierite particles. In an alternative lean/rich mode, NO level, as a function of sulfur poisoning and regeneration, was observed and recorded.

After the experiment started, the NO level in the exit of the catalyst increases gradually with time, because more and more sulfur was adsorbed on the NOx trap. The degradation of NO conversion is an indication of "the degree of NOx trap being poisoned in SO2 environment." A degraded NOx trap was then regenerated at a given temperature. Observation and recording of NOx trap performance was then repeated. A good regenerated NOx trap should show a NO conversion level as if it had not been poisoned.

Unless specified, the NOx performance test was carried out at a constant temperature, 300° C.

Test Procedure

Sample is aged at 700° C. for 2 hours in air (oven) before test.

NOx and SOx base lines were determined without catalyst first in the reactor prior to run the sample.

Test tube loading: sample T2 was loaded in the reactor tube as well mixed (100 mg trap material)+(100 mg cordierite, diluent); other samples (50 mg trap material)+(50 mg cordierite); total gas flow was 100 sccm. There was a VHSV: 25,000/hr and an equivalent of 200 g/(ft)3 Pt loading for T2; VHSV: 50,000/hr and an equivalent of 100 g/(ft)3 Pt loading for other samples (T1, T3, T4 and T5).

At 300° C. constant temperatures, ran lean/rich cycles for 2 hours and recorded the level of NO changes. When the catalyst was poisoned by S, the NOx level should increase gradually. Then the NOx/SOx trap was regenerated at a given temperature (e.g. 450° C., 500° C., 550° C.) for 15 minutes. After regeneration of S, NOx trap function was retested. Compare the NOx level with original level to verify the effectiveness of regeneration.

Result 1 Comparison of Performance of NOx Trap Samples in Lean/Rich Mode Being Sulfated and Regenerated The %NO conversion is tabulated in the following table. Higher %NO conversion indicates a more effective NOx trap performance, lower %NO a less effective NOx trap, either poisoned by sulfur and/or less regenerated by the regeneration process.

% NO conversion—poisoned by SO2 and the recovery after regeneration

| sample | A | A' | B | C | D | regeneration |
|---|---|---|---|---|---|---|
| T1 (E1) | 68% | — | 46% | — | 68% | 400° C. |
| T2 (E2) * | 75% | — | 74% | 73% | 77% | 400° C. |
| T3 (E3) | 58% | — | 46% | — | 70% | 550° C. |
| T4 (E4) | 77% | — | 68% | — | 77% | 500° C. |
| T5 (E5) | 31% | 19% | — | — | — | ** cannot be regenerated @550 C. |

* 100 mg loading (25,000 VHSV)
** T5 had the same composition as T3 but was not synthesized by hydrothermal process. T5 was made by co-precipitation method. T5 had a NOx conversion activity much lower than T3. In addition, It was found that T5 could not be regenerated at 550° C.
A: initial NO conversion of a fresh sample w/o sulfur
A': exposed to 60 ppm $SO_2$ for 15 minutes
B: exposed to 60 ppm $SO_2$ for 1 hour.
C: exposed to 60 ppm $SO_2$ for 2 hours.
D: after regeneration for 15 minutes.

Results 2 Performance of Continuous Trapping NOx in Prolong Length of Time in Sulfur Environment Without Regeneration Sample T2 has exposed to 60 ppm $SO_2$ for prolong length of time. After 22 hours, the NO conversion level kept at 49%. At 300° C. working temperature, sulfur could be partially regenerated and therefore the NOx trap T2 remained active (at a lower level). In this sense, T2 was a sulfur resistant NOx trap.

Example 6 (E6)

This example illustrates a NOx trap sample prepared with Fe as one of the key components. The results of a model gas reactor clearly showed that the sample was capable of partially regenerate sulfur at the 300° C. operation temperature, while it also performed NOx trap function at the same time. The NOx trap was a sulfur resistant NOx trap and it would maintain certain amount of NOx activity for practically no limit of time.

Forty five point zero four grams of aluminum acetate Al—Ac (65.5 wt % $Al_2O_3$), 55.80 grams of iron nitrate Fe—N (14.0 wt %, Fe), and 34.14 grams of lanthanum nitrate La—N solution (27.1 wt % $La_2O_3$) precursors were weighed. Iron nitrate was dissolved in lanthanum nitrate solution. A slurry of Al—Ac was made with 200 grams of D.I. Water. The slurry was constantly stirred for 2 hours and started to gel. The nitrate solution was added into Al—Ac slurry. A thick dark brown gel was formed. The gel was aged over night. A pH 3.5 was measured. The aged gel was submitted for hydrothermal treatment at 250° C. for 72 hours. The precipitate was separated from mother liquor, washed once, and dried over night. The mother liquor had a pH<3.

Preparation of the Test Sample for Mini-Reactor

Example T6

The same test sample preparation method was used in preparing T6. T6 was made from E6, having granular shape of 300 um diameter and loaded with 1 wt % Pt.

Testing Results

Test method was the same as used in T1 to T5, with a 50 mg sample loading and 50,000/hr. VHSV. In 60 ppm $SO_2$ environment, the time zero NO conversion was 57%, then reduced to 47% after 1 hour, and 50% 2 hours. However, the zero time activity increased to 70% after a 500C regeneration. After a long period of continuous test, the trap still showed NOx activity. After 68 hours, the NO conversion was 47%. Considering that the amount of $SO_2$ flew through was (calculated) about 1 mg per hour, there were 68 mg of $SO_2$ passing the 50 mg sample in 68 hours. This clearly showed that the sample was capable of partially regenerate sulfur at 300° C. operation temperature, while it also performed NOx trap function at the same time. NOx trap T6 was a sulfur resistant NOx trap and it would maintain certain amount of NOx activity for practically no limit of time. The sulfur regeneration temperature was quite low. After the 68 hours continuous test, the NOx activity was recovered with 400° C. sulfur regeneration.

While the invention has been described in detail with respect to specific embodiments thereof, such embodiments are illustrative and the scope of the invention is defined in the appended claims.

We claim:

1. A method for removing NOx contaminants from a SOx containing gaseous stream comprising the steps of:
   (1) providing a catalyst composite;
   (2) in a sorbing period, passing a lean gaseous stream comprising NOx and SOx within a sorbing temperature range through the catalyst composite to sorb at least some of the NOx contaminants and thereby provide a NOx depleted gaseous stream exiting the catalyst composite and to sorb and abate at least some of the SOx contaminants in the gaseous stream and thereby provide a SOx depleted gaseous stream exiting the catalyst composite;
   (3) in a NOx desorbing and abating period, changing the lean gaseous stream to a rich gaseous stream to thereby reduce and desorb at least some of the NOx contaminants from the catalyst composite and thereby provide a reduced NOx enriched gaseous stream exiting the catalyst composite;
   (4) in a SOx desorbing period, changing the lean gaseous stream to a rich gaseous stream and raising the temperature of the gaseous stream to within a desorbing temperature range to thereby reduce and desorb at least some of the SOx contaminants from the catalyst composite and thereby regenerate the catalyst composite and provide a reduced SOx enriched gaseous stream exiting the catalyst composite; and
   wherein the catalyst composite comprises:
      (a) a platinum component;
      (b) a support; and
      (c) a NOx sorbent component comprising a first metal oxide and a second metal oxide, wherein the metal in the first metal oxide is selected from the group consisting of aluminum, titanium, zirconium, silicon, and composites thereof, and the metal in the second metal oxide is a Group IIA metal selected from the group consisting of Beryllium, Magnesium, Calcium, Strontium, Barium, and Radium; a Group IIIa Metal selected from the group consisting of Scandium, Yttrium, Lanthanum, Cerium, Praeseodymium, Neodymium, Samarium, Europium, Gadolinium, Terbium, Dysprosium, Holmium, Erbium, Thulium, Ytterbium, Lutecium a Group IIIb Metal selected from the group consiting of Boron, Aluminium, Gallium, Indium, and Thallium; a Group IVa Transition Metal selected from the group consisting of Titanium, Zirconium, Hafnium, and Thorium; and a Group IVb element selected from the group consisting of Carbon, Silicon, Germanium, Tin, and Lead; rare earth metals; and transition metals; wherein the metal in the first metal oxide is different from the metal in the second metal oxide; wherein the NOx sorbent component is prepared by a hydrothermal synthesis process comprising the steps of:
(i) providing an aqueous suspension or solution of the first and second metal oxides, or precursors thereof, or both, wherein the precursors of the first and second metal oxides are metal salts which when hydrolyzed produce the respective metal oxides;
(ii) subjecting the suspension or solution of the first and second metal oxides, or precursors thereof, to a temperature from about 150° C. to about 300° C. in an autoclave under pressure for a time sufficient to produce a precipitate having an average particle size from about 0.001 to about 0.2 micron in a mother liquor; and
(iii) separating the precipitate from the mother liquor.

2. The method according to claim 1, wherein the SOx desorbing temperature range in (4) is greater than about 300° C.

3. The method according to claim 2, wherein the SOx desorbing temperature range in (4) is greater than about 350° C.

4. The method according to claim 3, wherein the SOx desorbing temperature range in (4) is greater than about 400° C.

5. The method according to claim 4, wherein the SOx desorbing temperature range in (4) is greater than about 450° C.

6. The method according to claim 1, further comprising a platinum group metal component other than platinum.

7. The method according to claim 6, wherein the platinum group metal component is selected from the group consisting of palladium, rhodium, ruthenium, and iridium components, and mixtures thereof.

8. The method according to claim 1, wherein the support is selected from the group consisting of alumina, silica, titania, and zirconia compounds.

9. The method according to claim 1, wherein the support is selected from the group consisting of activated alumina, alumina-ceria, alumina-chromia, alumina-silica, alumina-zirconia, silica, silica-titania, silica-titania-alumina, silica-titania-zirconia, titania, zirconia, zirconia-titania, and zirconia-alumina-titania.

10. The method according to claim 1, wherein the metal in the second metal oxide is selected from the group consisting of magnesium, calcium, strontium, barium, scandium, titanium, zirconium, hafnium, lanthanum, cerium, praseodymium, neodymium, samarium, europium, gadolinium, terbium, dysprosium, holmium, erbium, thulium, ytterbium, vanadium, chromium, manganese, iron, cobalt, nickel, copper, and zinc.

11. The method according to claim 10, wherein the metal in the second metal oxide is selected from the group consisting of barium, lanthanum, cerium, iron, cobalt, and copper.

12. The method according to claim 1, wherein the metals in the first and second metal oxides are selected from the group consisting of aluminum/cerium/barium, aluminum/copper/lanthanum, aluminum/cobalt/lanthanum, and iron/aluminum.

13. The method according to claim 1, wherein the metal in the first metal oxide and the metal in the second metal oxide are present in a mole ratio from about 3:7 to about 9:1, respectively.

14. The method according to claim 13, wherein the metal in the first metal oxide and the metal in the second metal oxide are present in a mole ratio from about 4:6 to about 8.5:1.5, respectively.

15. The method according to claim 1, wherein the catalyst composite comprises:
(i) at least about 1 $g/ft^3$ of the platinum component;
(ii) from about 0.15 $g/in^3$ to about 6.0 $g/in^3$ of the support; and
(iii) from about 0.025 $g/in^3$ to about 4 $g/in^3$ of the $NO_x$ sorbent component.

16. The method according to claim 1, wherein the precursors of the first metal oxide and second metal oxide are water-soluble/dispersible metal salts selected from the group consisting of acetates, nitrates, hydroxides, oxychlorides, hydroxychlorides, carbonates, sulfates, oxalates, and tartrates.

17. The method according to claim 1, wherein the suspension or solution of metal hydroxides in (4)(c)(ii) is subjected to a temperature from about 175° C. to about 250° C.

18. The method according to claim 1, wherein the precipitate in (4)(c)(ii) has an average particle size from about 0.01 to about 0.2 micron.

19. The method according to claim 1, wherein the catalyst composite is supported on a metal or ceramic honeycomb carrier or is self-compressed.

20. The method according to claim 1, wherein the NOx sorbent component further comprises a third metal oxide, wherein the metal in the third metal oxide is different from the metals in the first and second metal oxides.

* * * * *

UNITED STATES PATENT AND TRADEMARK OFFICE
CERTIFICATE OF CORRECTION

PATENT NO. : 6,585,945 B2
DATED : July 1, 2003
INVENTOR(S) : Joseph H-Z. Wu and Joseph C. Dettling It is certified that error appears in the above-identified patent and that said Letters Patent is hereby corrected as shown below:

<u>Title page,</u>
Item [45], Date of Patent, insert -- * -- before "Jul. 1, 2003".

<u>Column 25,</u>
Line 7, after "Ytterbium" insert -- and --.
Line 7, after "Lutecium" insert -- ; --.
Line 8, delete "consiting" and replace with -- consisting --.

Signed and Sealed this

Fifteenth Day of June, 2004

JON W. DUDAS
*Acting Director of the United States Patent and Trademark Office*